(12) United States Patent
Bird et al.

(10) Patent No.: US 7,640,277 B2
(45) Date of Patent: Dec. 29, 2009

(54) METHOD FOR RELEASING A SAVEPOINT

(75) Inventors: Paul Miller Bird, Markham (CA); Yin Ling Cheung, Markham (CA); Yuk Kuen Chan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/069,733

(22) Filed: Feb. 28, 2005

(65) Prior Publication Data
US 2006/0195485 A1   Aug. 31, 2006

(51) Int. Cl.
*G06F 17/30* (2006.01)

(52) U.S. Cl. .......................... 707/203; 707/8; 707/100; 707/200; 707/201; 707/202; 709/203; 709/217

(58) Field of Classification Search ................. 707/203, 707/8, 202, 200, 100, 201; 709/203, 217
See application file for complete search history.

(56) References Cited

U.S. PATENT DOCUMENTS

| | | | |
|---|---|---|---|
| 5,630,124 A | | 5/1997 | Coyle, Jr. et al. |
| 5,870,545 A | | 2/1999 | Davis et al. |
| 5,983,225 A | * | 11/1999 | Anfindsen .................. 707/8 |
| 6,219,666 B1 | * | 4/2001 | Krishnaswamy et al. ........ 707/8 |
| 6,301,677 B1 | * | 10/2001 | Squibb ..................... 714/13 |
| 6,490,610 B1 | * | 12/2002 | Rizvi et al. ................. 718/101 |
| 6,539,402 B1 | * | 3/2003 | Sorenson et al. ............ 707/202 |
| 6,816,873 B2 | | 11/2004 | Cotner et al. |
| 7,028,057 B1 | * | 4/2006 | Vasudevan et al. .......... 707/203 |
| 7,206,805 B1 | * | 4/2007 | McLaughlin, Jr. ........... 709/203 |
| 2002/0087561 A1 | * | 7/2002 | Ching Chen et al. ........ 707/100 |
| 2002/0169781 A1 | | 11/2002 | Poole et al. |
| 2002/0174108 A1 | * | 11/2002 | Cotner et al. .................. 707/3 |
| 2003/0004970 A1 | | 1/2003 | Watts |
| 2003/0046673 A1 | | 3/2003 | Copeland et al. |
| 2003/0204534 A1 | | 10/2003 | Hopeman et al. |
| 2003/0208464 A1 | * | 11/2003 | Lee et al. ..................... 707/1 |
| 2004/0068501 A1 | * | 4/2004 | McGoveran .................. 707/8 |

OTHER PUBLICATIONS

Watts, Julie: "A method for Releasing Update Locks on Rollback to Savepoint," DOSS Document #: SVL920010002US1, Jun. 28, 2001.

(Continued)

*Primary Examiner*—Mohammad Ali
*Assistant Examiner*—Syling Yen
(74) *Attorney, Agent, or Firm*—Sughrue Mion, PLLC

(57) ABSTRACT

A method for releasing a nested savepoint on a remote node of a database management system. The to-be-released savepoint is one of a series of savepoints represented by control blocks arranged in a linked list in the creation order of the savepoints they represent. Releasing of the to-be-released savepoint begins with receiving of a request to release the to-be-released savepoint. A control block is selected such that it represents the to-be-released savepoint or the next more recently created savepoint after the to-be-released savepoint. The selected control block is merged with all other control blocks that represent savepoints that are more recently created than the savepoint represented by the selected control block. The resulting merged control block represents all of the savepoints from the most recently created to the savepoint previously represented by the selected control block.

21 Claims, 8 Drawing Sheets

OTHER PUBLICATIONS

Bird, P. et al.: "A method for Coordinating SQL Cursor States In A Client/Server Environment When Using Nested Savepoints On A Relational Database," RD No. 440, Dec. 2000, Article 135, p. 2183.

Pickel, J. et al.: "Method for Managing Distrubted Savepoints Across Multiple DBMS's Within A Distributed Transaction," DOSS Document #: SVL920010019US, May 15, 2001.

* cited by examiner

METHOD FOR RELEASING A SAVEPOINT

FIELD OF INVENTION

The present invention relates to the field of database management systems. In particular, the present invention relates to an apparatus, a method and a computer program product for releasing a savepoint in a database management system.

BACKGROUND

In a database management system (DBMS) a savepoint is a designated point to which operations on a database can be rolled-back (i.e. the database can be restored to a state that existed before the operations were executed). Typically the savepoint is created before an operation that will change the database such as an insert, update or delete. The operation can comprise multiple operations. Once the operation has completed successfully the savepoint can be released.

Support for nested savepoints is a feature in some database management systems. Nesting of savepoints occurs when more than one savepoint is active at one time. Control blocks can be used to uniquely represent each of the multiple savepoints. When a savepoint is released the corresponding control block is destroyed. This approach functions adequately in a single partition or an inter-dependent partitioned database environment.

In a DBMS environment having multiple database partitions each independent of the others (i.e. shared-nothing), savepoint information must be coordinated between the database partitions and therefore the nodes associated with the partitions such as, for example, a coordinator node and a remote node. When an application of the database management system indicates that data will be modified in the database partition associated with the remote node, savepoint information stored at the coordinator node must be sent to the remote node in order to ensure coordination of the savepoints from the application's perspective. This is a potentially demanding requirement as multiple nested savepoints may exist at the coordinator node and each must be sent to the remote node. When a release savepoint request is received at the coordinator node, the request is forwarded to the remote node so that the savepoints and the corresponding control blocks can be properly maintained on the remote node as well. This too is a potentially processing intensive requirement as savepoint and control block management must be carried out for each savepoint both on the coordinator node and on the remote node.

What is needed is a apparatus and a method for releasing a nested savepoints on the remote node of a database management system that mitigates the processing intensiveness of releasing the savepoint.

SUMMARY OF INVENTION

An apparatus, a method and a computer program product for releasing a nested savepoint on a remote node of a database management system. The to-be-released savepoint is one of a series of savepoints represented by control blocks arranged in a linked list. Each savepoint has an order-of-creation index savepoint identifier (e.g. the savepoints can be sequentially numbered). The control blocks in the linked list are arranged in the creation order of the savepoints they represent with the control block representing the most recently created (i.e. newest) savepoint at the start of the list. Releasing of the to-be-released savepoint begins with receiving of a request to release the to-be-released savepoint. A control block is selected such that it represents the to-be-released savepoint or if no such control block exists, such that the selected control block represents the next most recently created savepoint after the to-be-released savepoint. The selected control block is merged with all other control blocks that represent savepoints that are more recently created than the savepoint represented by the selected control block. The resulting merged control block represents all of the savepoints from the most recently created to the savepoint previously represented by the selected control block. The other control blocks are removed from the linked list and the linked list re-arranged accordingly.

In accordance with one aspect of the present invention, a database management system for releasing a to-be-released savepoint, the to-be-released savepoint being one of a plurality of savepoints represented by a plurality of control blocks arranged in a linked list, the database management system comprising: a request receiver for receiving a request to release the to-be-released savepoint; a control block selector for selecting a control block from the plurality of control blocks, wherein the selected control block is a control block representing the to-be-released savepoint; and a control block merger for merging the selected control block with all other control blocks in the plurality of control blocks representing savepoints that are more recently created than the savepoint represented by the selected control block.

In accordance with another aspect of the present invention, a method of releasing a to-be-released savepoint, in a database management system, the to-be-released savepoint being one of a plurality of savepoints represented by a plurality of control blocks arranged in a linked list, the method comprising the steps of: receiving a request to release the to-be-released savepoint; selecting a control block from the plurality of control blocks, wherein the selected control block is a control block representing the to-be-released savepoint; and merging the selected control block with all other control blocks in the plurality of control blocks representing savepoints that are more recently created than the savepoint represented by the selected control block.

In accordance with still another aspect of the present invention, an article of manufacture for releasing a to-be-released savepoint in a database management system, the to-be-released savepoint being one of a plurality of savepoints represented by a plurality of control blocks arranged in a linked list, the article of manufacture including a program usable medium embodying one or more instructions executable by the data processing system, the one or more instructions including data processing system executable instructions for receiving a request to release the to-be-released savepoint, data processing system executable instructions for selecting a control block from the plurality of control blocks, wherein the selected control block is a control block representing the to-be-released savepoint, and data processing system executable instructions for merging the selected control block with all other control blocks in the plurality of control blocks representing savepoints that are more recently created than the savepoint represented by the selected control block.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 1:
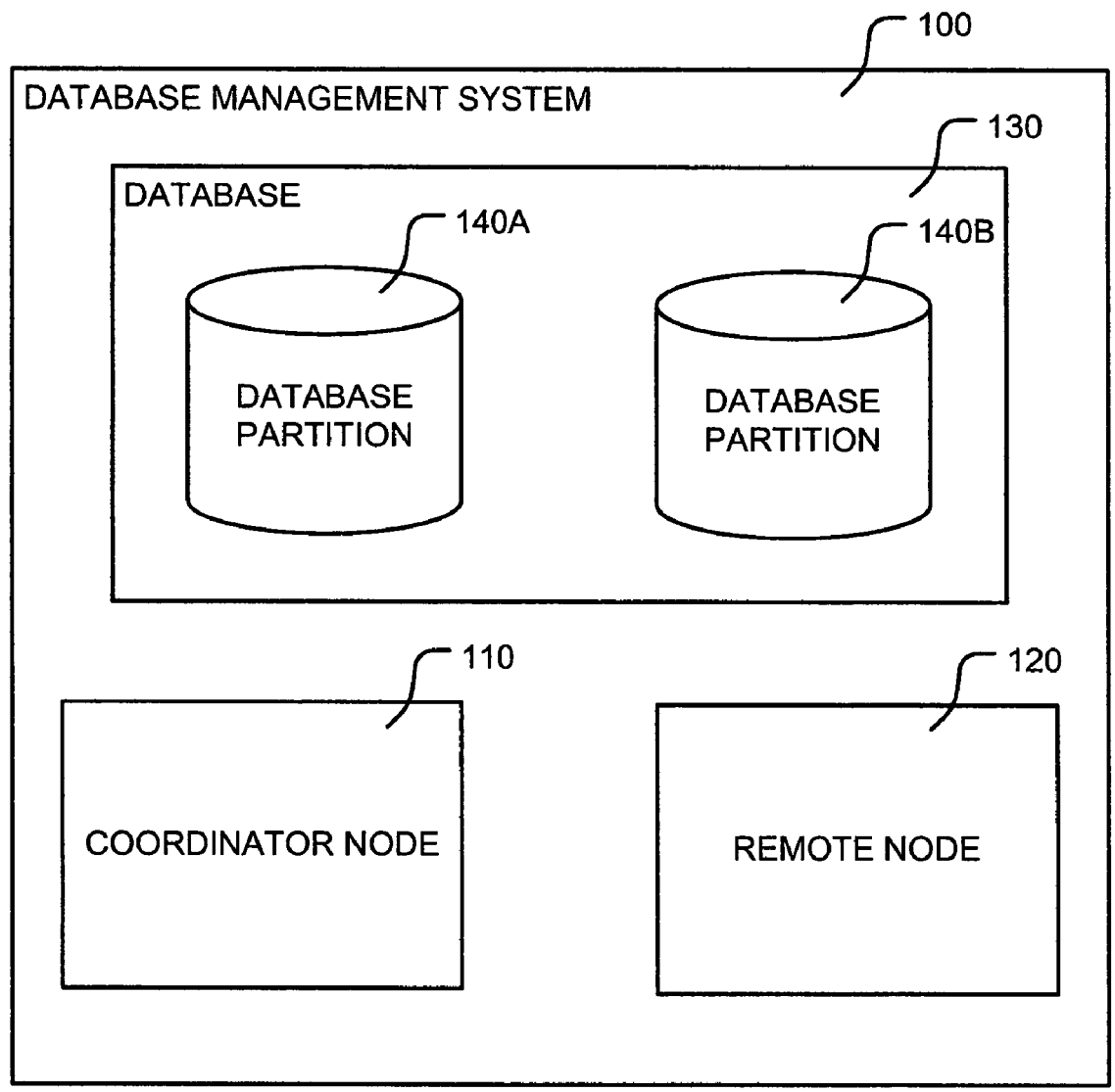
FIG. 1 is a schematic representation of an exemplary environment in which the present invention can be practiced.

FIG. 1 is a schematic representation of an exemplary environment in which the present invention can be practiced. A database management system (DBMS) 100 includes a coordinator node 110, a remote node 120 and a database 130. The coordinator node 110 and the remote node 120 can be associated with a common, shared computing platform or separate computing platforms. An application operating on the DBMS 100 can be connected to the coordinator node 110. The DBMS 100 is, for example, a partitioned database implementation with the database 130 comprising independent database partitions 140A, 140B each associated with one of the coordinator node 110 and the remote node 120 respectively. Requests to create savepoints for the database 130 are processed on the coordinator node 110. Each savepoint has an associated savepoint identifier which is a unique sequential index based on the order of the savepoint's creation. For each savepoint creation request a corresponding control block is created. The control blocks are arranged as a linked list with a start-of-list link linked to a first control block in the linked list. (See FIGS. 4A-E for exemplary instances of linked list 400 of control blocks 420.) Each control block 420 in the linked list 400, with the exception of a last control block 420, has a next-in-list link to another control block 420 in the linked list. Each control block 420 has a savepoint identifier field, a newest-savepoint identifier field and a flag field. The savepoint identifier field is set to the savepoint identifier of the savepoint associated with the control block 420. The newest-savepoint identifier field can be set to the identifier of the most recently created savepoint represented by the control block 420. Initially the newest-savepoint identifier field is also set to the savepoint identifier of the savepoint associated with the creation of the control block 420. The flag field can indicate that the control block 420 represents a single savepoint or a list of savepoints. The flag field is initially set to indicate that the control block 420 represents a single savepoint.

The control blocks 420 in the linked list 400 are arranged such that the start-of-list link is linked to the most recently created control block 420 in the linked list 400 (i.e. the control block 420 having the newest savepoint identifier in its savepoint identifier field), in turn each control block 420 has its next-in-list link linked to the control block 420 having the next older (i.e. next less recently created) savepoint identifier in its savepoint identifier field down to a control block 420 having the oldest savepoint identifier in its savepoint identifier field and its next-in-list link is not linked to another control block 420. The linked list 400 is administered in a first-in, last-out (FILO) manner.

When an operation such as, for example, an insert, update or delete (IUD) operation is to be executed on the database partition 140B, savepoint information on the coordinator node 110 is sent to the remote node 120. The information sent to the remote node 120 takes the form of an insert savepoint request identifying the savepoint within which the IUD request is occurring (e.g. the savepoint associated with the savepoint identifier in the savepoint identifier field of the control block 420 linked by the start-of-list link on the coordinator node). The insert savepoint request can, for example, be sent as additional information accompanying a IUD request sent to the remote node. If there is no IUD operation executed on node 120 (i.e. none affecting database partition 140B) between the creation of successive savepoints, not all of the savepoints represented in the control blocks 420 of the linked list 400 will be included in an insert savepoint request sent to the remote node 120.

The remote node 120 also manages a linked list of control blocks 420 (herein after the remote linked list 450) in a manner similar to that described above with respect to the linked list 400 on the coordinator node 110. Control blocks 420 are created on the remote node 120 and inserted into the remote linked list 450 in response to an insert savepoint request from the coordinator node 110.

Savepoints can be released in an order unrelated to the order in which they were created; however the savepoints are administered in a first-in, last-out fashion. When a given savepoint is released, all of the savepoints that were more recently created than the given savepoint are effectively released. On releasing a savepoint on the coordinator node 110, the control block 420 whose savepoint identifier field is set to the value of the savepoint identifier of the to-be-released savepoint (herein after the selected control block 420) together with all of the control blocks 420 between the start-of-list link and the selected control block 420 are removed from the linked list. The remaining control blocks 420 are re-linked so that start-of-list link is linked to a control block 420 (if there was one) to which the selected control block 420 was linked.

When a savepoint is released on the coordinator node 110, it needs also to be released on the remote node 120. However, not all savepoints are directly represented by control blocks 420 on the remote node 120. When multiple savepoints are generated on the coordinator node 110 before a UID operation is executed, only the most recently created of the savepoints is included in the insert savepoint request sent to the remote node 120. A released savepoint may, therefore, not directly match any of the control blocks 420 in the remote linked list 450 on the remote node 120.

Figure 2:
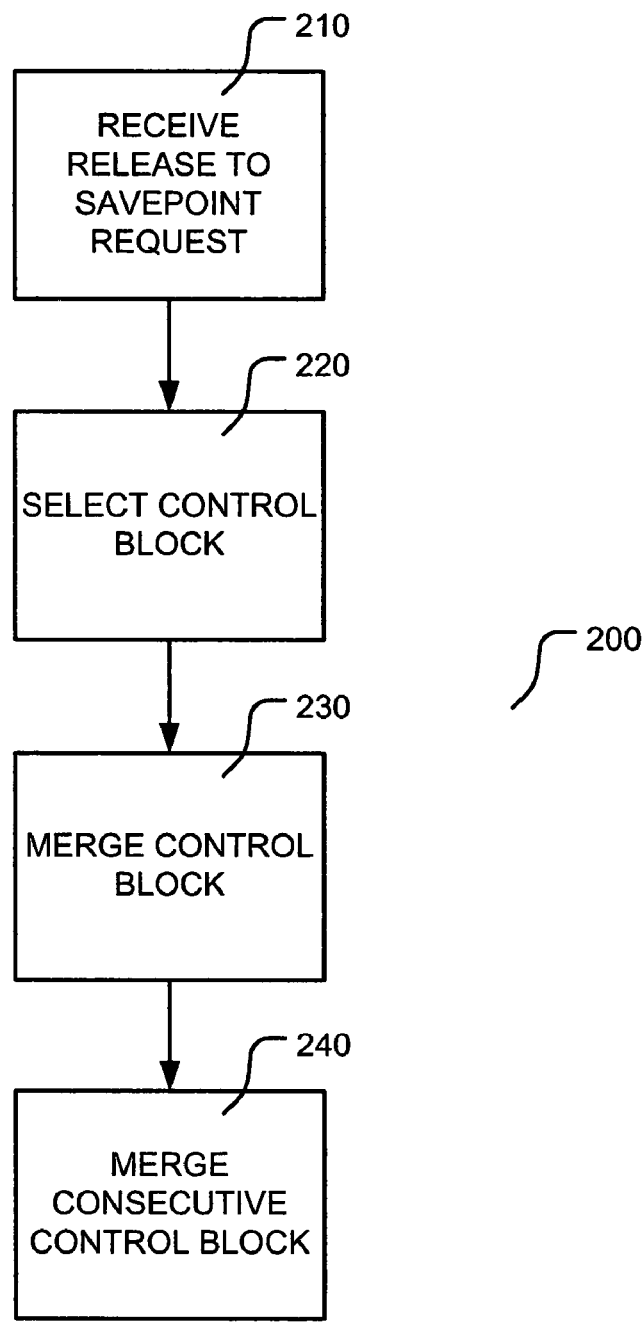
FIG. 2 is a flowchart of steps, according to the method of the present invention.

FIG. 2 is a flowchart of steps, according to the method 200 of the present invention, for releasing a savepoint on the remote node 120 in response to receiving a release savepoint request 210 identifying a to-be-released savepoint. A control block 420 (the selected control block 420) is selected 220 based on matching the criteria that the savepoint identifier field in the control block 420 is equal to the identifier of the to-be-released savepoint or, failing to find an equal value, the value in the savepoint identifier field in the control block 420 is the next closest more recent value compared to the identifier of the to-be-released savepoint (e.g. the smallest savepoint identifier that is greater than the savepoint identifier of the to-be-released savepoint). The selected control block 420 can be identified by, for example, scanning the remote linked list 450 of control blocks 420 from the start-of-list link, testing for a match of the identifier of the to-be-released savepoint with the savepoint identifier field in the control block 420, selecting the control block 420 in the case of a match, moving to the control block 420 linked by the next-in-list link of the current control block 420 in the case of no match, selecting the previous control block 420 when the value in the savepoint identifier field in the control block 420 is less than the identifier of the to-be-released savepoint or selecting the control block 420 when the next-in-list link is not linked to another control block 420 (indicating the end of the linked list).

The selected control block 420 is then merged 230. When the selected control block 420 is merged (i.e. savepoint is released), all of the control blocks 420 between the start-of-list link and the selected control block 420 are merged into the selected control block 420. The value in the savepoint identifier field of the newest control block 420 (i.e. the control block 420 linked by the start-of-list link) is copied to the newest savepoint identifier field of the selected control block 420 and the flag field of the selected control block 420 is set to indicate that the control block 420 represents a list of savepoints. All of the control blocks 420 between the start-of-list link and the selected control block 420 (but not including this last control block 420) are deleted and the start-of-list link is linked to the selected control block 420. The flag field is set to indicate that the selected control block 420 represents a list of savepoints (i.e. the newest savepoint to the to-be-released savepoint).

When the control block 420 linked to by the next-in-list link (herein after the next control block 420) of a merged control block 420 represents a savepoint that is consecutive to the savepoint represented by the merged control block 420, then these control blocks 420 can be further merged 240. The next control block 420 is consecutive if either the value in its savepoint identifier field or in its newest savepoint field has the next smaller savepoint identifier (i.e. represents the consecutively next oldest savepoint) compared to the savepoint identifier field of the merged control block 420. When the next control block 420 is consecutive, it is merged into the merged control block 420 by setting the savepoint identifier field and the next-in-list link of the merged control block 420 to the value of the savepoint identifier field and the next-in-list link of the next control block 420 respectively. The next control block 420 is deleted. The resulting merged control block 420 represents the savepoints from the newest savepoint to the savepoint formerly represented by the next control block 420.

The method 200 according to the present invention can be implemented by a computer program product comprising computer executable program codes devices. The computer program product can be executed on a computing platform such as, for example, the database management system 100 represented in FIG. 1.

Figure 3:
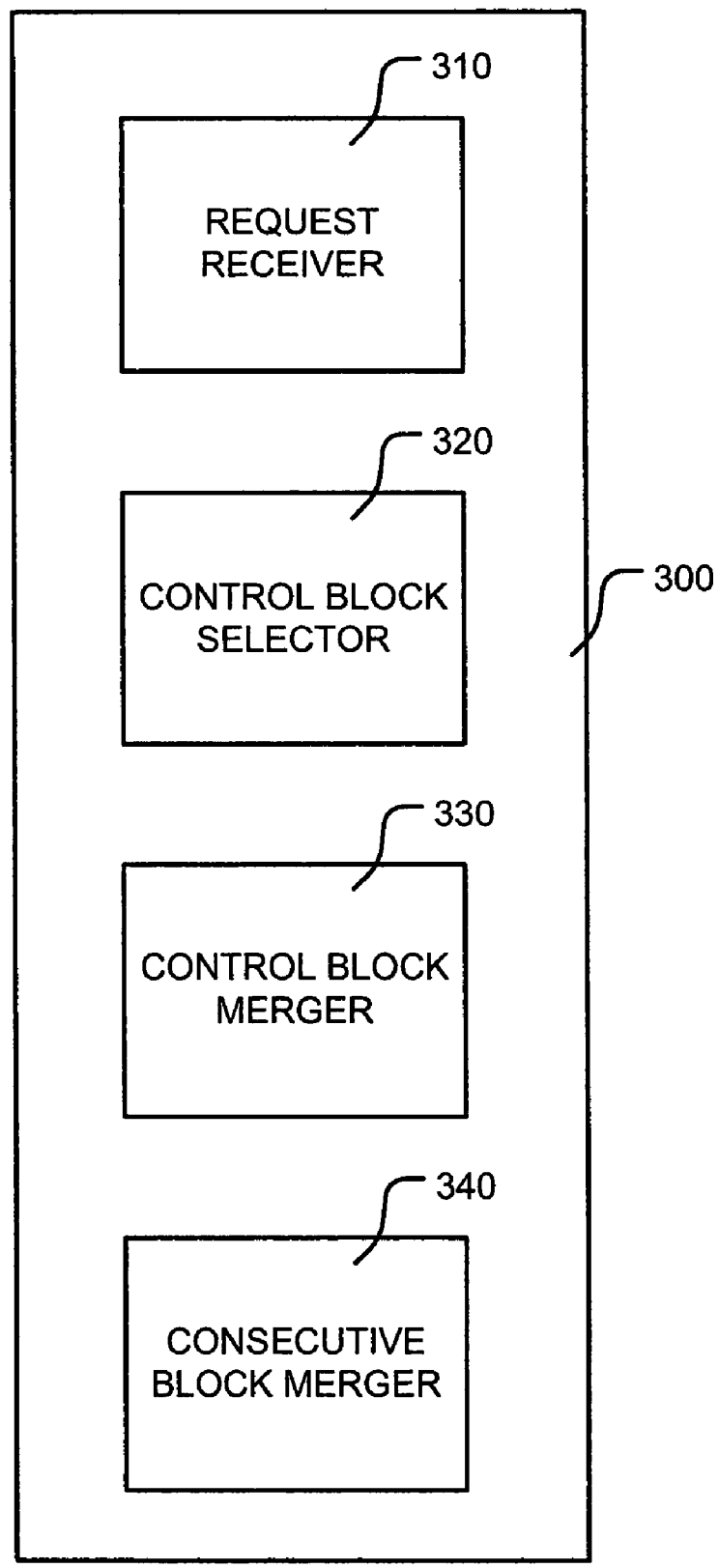
FIG. 3 is a schematic representation of an exemplary embodiment of an apparatus according to the present invention.

FIG. 3 is a schematic representation of an exemplary embodiment of an apparatus 300 according to the present invention. The apparatus 3.00 can be used to implement the method 200 according to the present invention. The apparatus 300 comprises a request receiver 310, a control block selector 320, a control block merger 330 and a consecutive block merger 340. The request receiver 310 can receive a release savepoint request, containing the savepoint identifier of a to-be-released savepoint, from, for example, the coordinator node 110. The control block selector 320 can select a control block 420 (the selected control block 420) from the remote linked list 450 using the savepoint identifier contained in the release to savepoint request. The control block 420 can be selected in accordance with step 220 of the method 200 described above. The control block merger 330 merges the control blocks 420 in the remote linked list 450 between the start-of-list link and the selected control block 420 into the selected control block 420. After the merge, the selected control block 420 represents the savepoints from the newest savepoint to the savepoint previously represented by the selected control block 420. The consecutive block merger 340 can determine if the control block 420 linked by the next-in-list link of the selected control block 420 is consecutive to the selected control block 420 in accordance with step 240 of the method 200 described above. If the control blocks 420 are found to be consecutive, they can be merged by the consecutive block merger 340 in accordance with step 240 of the method 200 described above.

FIGS. 4A-E are schematic representations of a time sequence of events, in an exemplary scenario, for linked lists of control blocks 420 on the coordinator node 110 and the remote node 120. A linked list 400 of control blocks 420 is maintained on the coordinator node 110 and a remote linked list 450 of control blocks 420 is maintained on the remote node 120. The exemplary scenario represented in FIGS. 4A-E results from the execution of the following operations on the database management system.

| Line | Operation | Savepoint identifier | Send to remote node |
|---|---|---|---|
| 1 | Create savepoint SP1 | 7 | No |
| 2 | Create savepoint SP2 | 8 | No |
| 3 | Insert statement | | Yes |
| 4 | Create savepoint SP3 | 9 | No |
| 5 | Insert statement | | Yes |
| 6 | Release savepoint SP2 | 8 | Yes |
| 7 | Rollback to savepoint SP1 | 7 | Yes |

Figure 4A:
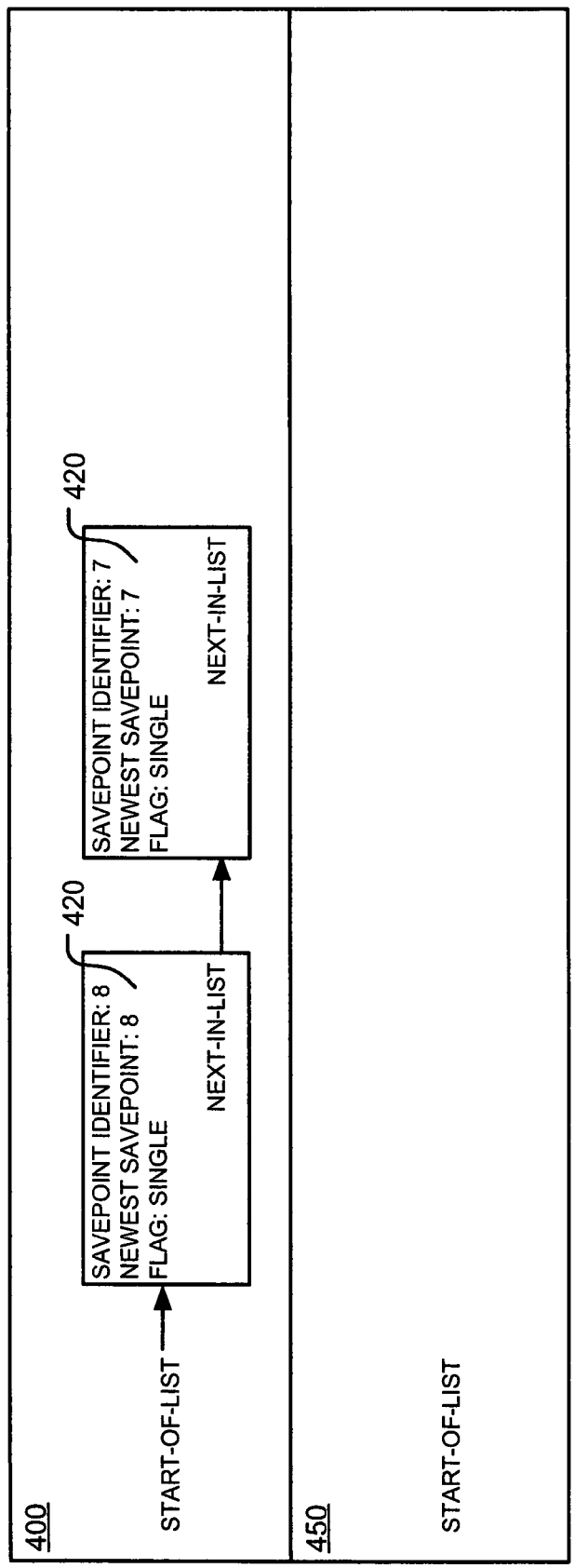
FIGS. 4A-E are schematic representations of a time sequence of events, in an exemplary scenario, for linked lists of control blocks on a coordinator node and a remote node.

At line 1 a savepoint SP1 having savepoint identifier value of 7 (ID=7) is created on the coordinator node 110 but is not sent to the remote node 120. At line 2 a savepoint SP2 having savepoint identifier value of 8 (ID=8) is created on the coordinator node 110 but is not sent to the remote node 120. FIG. 4A represents the linked list 400 of control blocks 420 on the coordinator node 110 and the remote linked list 450 of control blocks 420 on the remote node 120 after the operations of lines 1 and 2 have completed. On the coordinator node 110 there are two control blocks 420, one for each of the two savepoints, with the most recently created control block 420 (corresponding to savepoint identifier 8) being linked by the start-of-list link. The remote linked list 450 is empty as neither line 1 or 2 results in a send to the remote node 120.

Figure 4B:
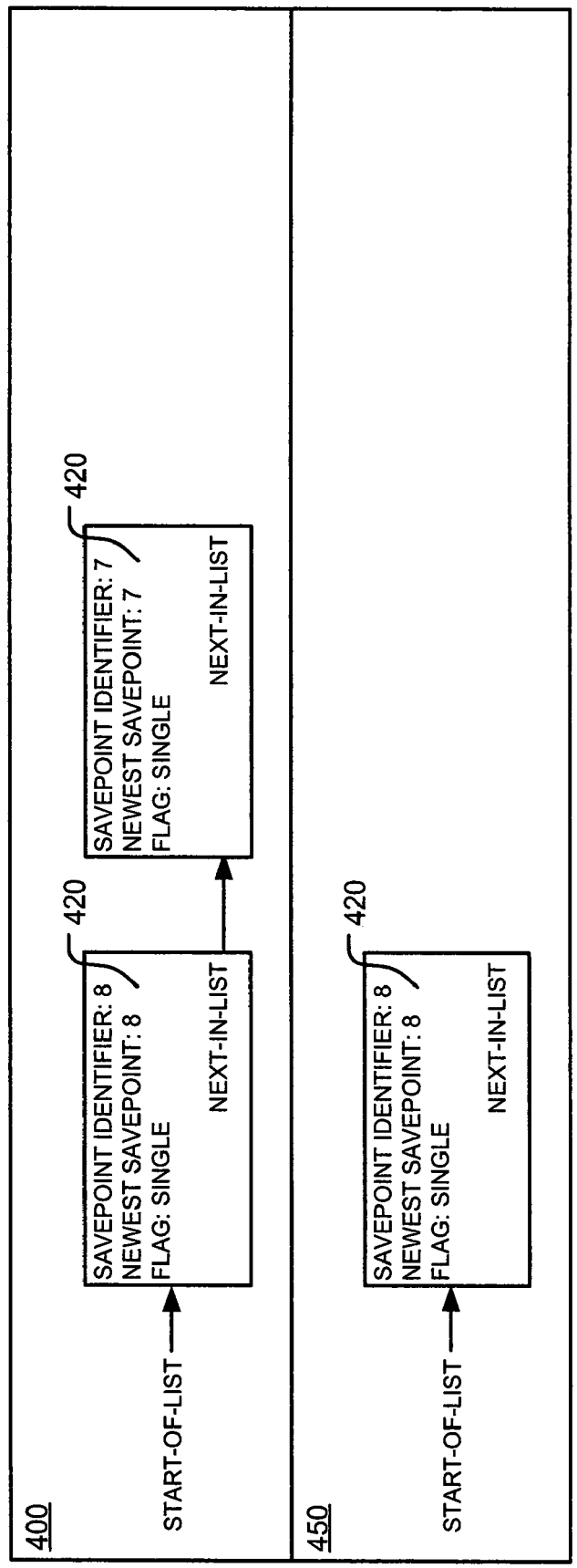

At line 3 there is a database insert statement (i.e. a IUD operation) that results in a send to the remote node 120. Only SP2 (ID=8), the most recently created savepoint is sent to the remote node 120. FIG. 4B represents the linked list 400 of control blocks 420 on the coordinator node 110 and the remote linked list 450 of control blocks 420 on the remote node 120 after the operations of line 3 has completed. The linked list 400 of control blocks 420 on the coordinator node 110 is unchanged. A control block 420 representing SP2 (ID=8) is added to the remote linked list 450 and is linked by the start-of-list link.

Figure 4C:
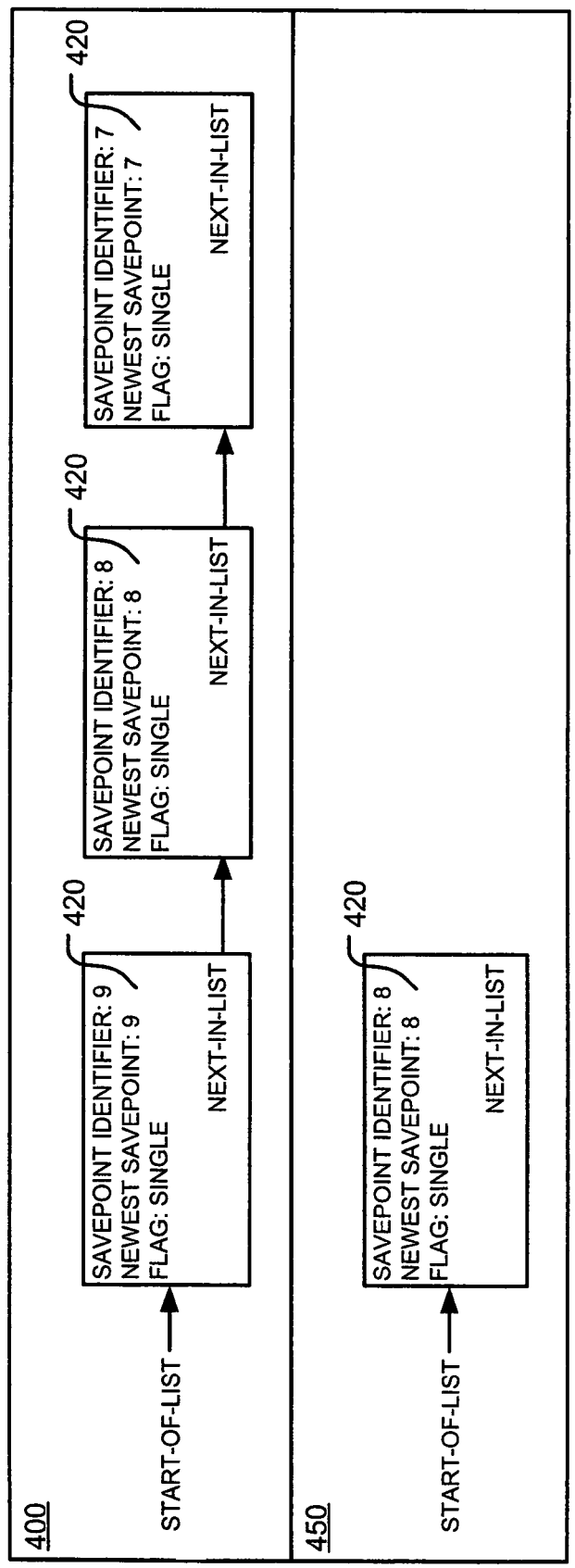

At line 4 a savepoint SP3 having savepoint identifier value of 9 (ID=9) is created on the coordinator node 110 but is not sent to the remote node 120. FIG. 4C represents the linked list 400 of control blocks 420 on the coordinator node 110 and the remote linked list 450 of control blocks 420 on the remote node 120 after the operations of line 4 has completed. A control block 420 representing SP3 (ID=9) is add to the linked list 400 and is linked by the start-of-list link. The remote linked list 450 of control blocks 420 on the remote node 120 is unchanged.

Figure 4D:
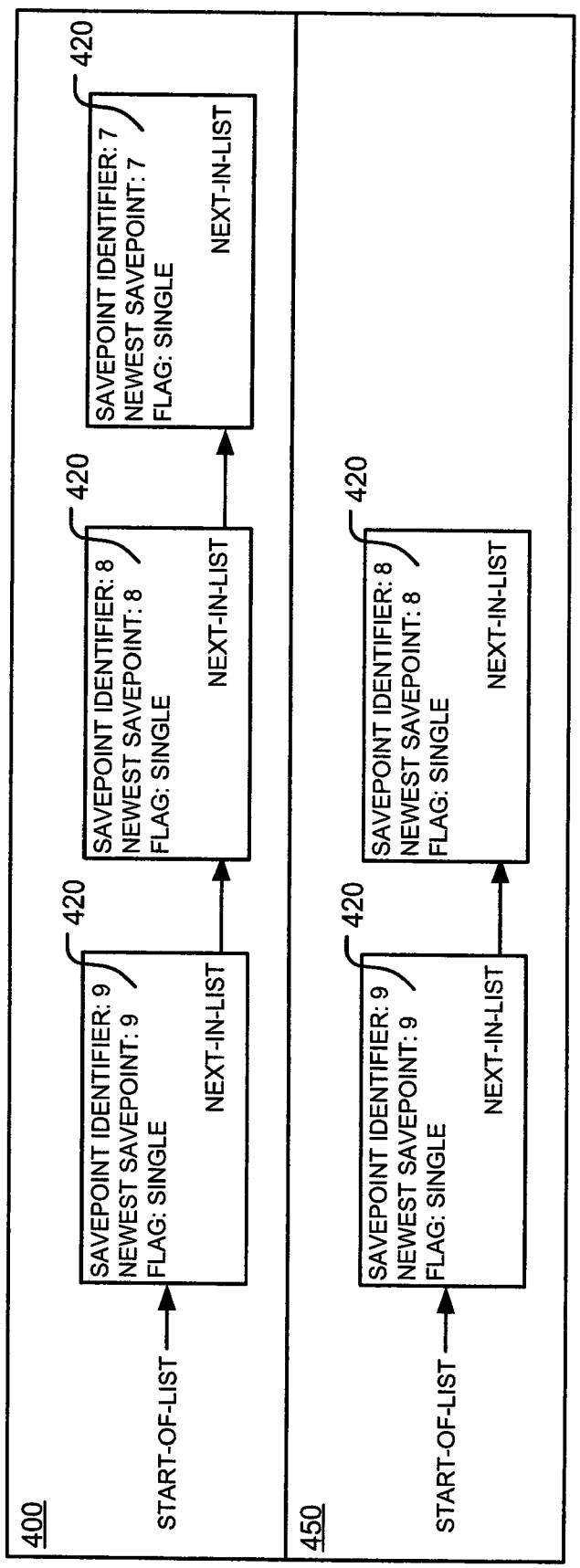

At line 5 there is another database insert statement that results in a send to the remote node 120. SP3 (ID=9), the most recently created savepoint is sent to the remote node 120. FIG. 4D represents the linked list 400 of control blocks 420 on the coordinator node 110 and the remote linked list 450 of control blocks 420 on the remote node 120 after the operations of line 5 has completed. The linked list 400 of control blocks 420 on the coordinator node 110 is unchanged. A control block 420 representing SP3 (ID=9) is added to the remote linked list 450 and is linked by the start-of-list link.

Figure 4E:
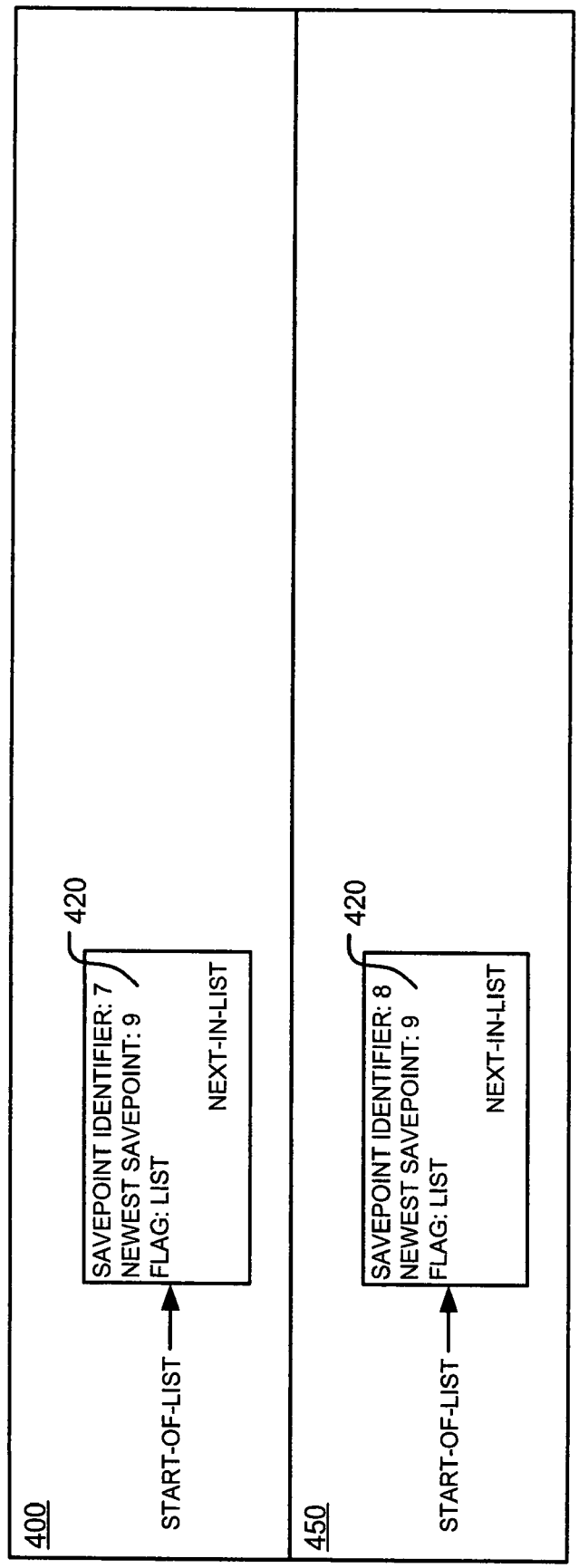

At line 6 a release to savepoint SP2 is issued. The release to savepoint SP2 (ID=8) is sent to the remote node 120. FIG. 4E represents the linked list 400 of control blocks 420 on the coordinator node 110 and the remote linked list 450 of control blocks 420 on the remote node 120 after the operations of line 6 has completed. The control blocks 420 in the linked list 400 on the coordinator node 110 representing SP2 (ID=8) is released. The control block 420 representing SP3 (ID=9) is merged into the control block 420 representing SP1 (ID=7) resulting in single control block 420 having a savepoint identifier field set to 7 for SP1, a newest savepoint field set to 9 for SP3 and flag field set to indicate that the control block 420 represents a list of savepoints. On the remote node 120, the control block 420 representing SP3 (ID=9) is merged into the control block 420 representing SP2 (ID=8) resulting in single control block 420 having a savepoint identifier field set to 8 for SP2, a newest savepoint field set to 9 for SP3 and flag field set to indicate that the control block 420 represents a list of savepoints.

At line 7 a rollback to SP1 is issued. The rollback to SP1 is sent to the remote node 120.

Although the above described embodiments include a single remote node 120, it will be understood that embodiments having multiple remote nodes 120, each operating according the above description, remain within the scope and spirit of the present invention.

It will be apparent to one skilled in the art that numerous modifications and departures from the specific embodiments described herein may be made without departing from the spirit and scope of the present invention.

The invention claimed is:

1. A data processing system implemented method of releasing a to-be-released savepoint at a remote node in a database management system, the to-be-released savepoint being one of a plurality of savepoints represented by a plurality of control blocks arranged in a linked list stored at the remote node, the data processing system implemented method comprising:
   receiving a request to release the to-be-released savepoint at the remote node from a coordinator node in the database management system;
   selecting a control block from the plurality of control blocks in the linked list stored at the remote node, wherein the selected control block is a control block representing the to-be-released savepoint;
   merging the selected control block in the linked list stored at the remote node with all other control blocks in the plurality of control blocks representing savepoints that are more recently created than the savepoint represented by the selected control block; and
   releasing the to-be-released savepoint,
   wherein the selecting comprises:
      determining whether a control block representing the to-be-released savepoint exists in the linked list stored at the remote node;
      if it is determined that the control block representing the to-be-released savepoint does not exist in the linked list stored at the remote node, selecting a second control block that represents a second savepoint created most recently after the control block representing the to-be-released savepoint; and
      setting the second control block as the control block representing the to-be-released savepoint.

2. The data processing system implemented method of claim 1, wherein the linked list comprises:
   a control block representing a most recently created savepoint,
   wherein each control block in the linked list comprises a link to another control block representing a less recently created savepoint, and
   wherein a control block representing a least recently created savepoint does not have a link to another control block.

3. The data processing system implemented method of claim 1 wherein the merging comprises removing the other control blocks from the linked list and re-arranging the linked list accordingly.

4. The data processing system implemented method of claim 1, wherein the merging comprises setting the selected control block to indicate that the selected control block represents a list of the savepoints from the most recently created savepoint to the savepoint previously represented by the selected control block before the merging.

5. The data processing system implemented method of claim 3 further comprising merging the selected control block with a next control block, linked by the selected control block, when the selected control block represents a savepoint that is consecutive with the savepoint represented by the next control block.

6. The data processing system implemented method of claim 5 wherein:
   the next control block is removed from the linked list and the linked list is re-arranged accordingly; and
   the selected control block is set to indicate that the selected control block represents a list of savepoints from the most recently created savepoint to the savepoint previously represented by the next control block before the next control block was removed.

7. A data processing system implemented method of releasing a to-be-released savepoint at a remote node in a database management system, the to-be-released savepoint being one of a plurality of savepoints represented by a plurality of control blocks arranged in a linked list stored at the remote node, the data processing system implemented method comprising:
   receiving a request to release the to-be-released savepoint at the remote node from a coordinator node in the database management system;
   selecting a control block from the plurality of control blocks in the linked list stored at the remote node, wherein the selected control block is a control block representing the to-be-released savepoint;
   merging the selected control block in the linked list stored at the remote node with all other control blocks in the plurality of control blocks representing savepoints that are more recently created than the savepoint represented by the selected control block; and
   releasing the to-be-released savepoint,
   wherein the selecting comprises:
      determining whether a control block representing the to-be-released savepoint exists in the linked list stored at the remote node;
      if it is determined that the control block representing the to-be-released savepoint does not exist in the linked list stored at the remote node, selecting a second control block that represents a second savepoint created most recently after the control block representing the to-be-released savepoint; and setting the second control block as the control block representing the to-be-released savepoint, and wherein if the selected control block is merged with all other control blocks in the plurality of control blocks representing savepoints that are more recently created than the savepoint requested by the selected control block, a newest-savepoint identifier field in the merged control block is set to indicate the most recently created savepoint represented by the control block.

8. The data processing system implemented method of claim 1, wherein each of the plurality of savepoints designates a point to which a database of the database management system can be restored.

9. The data processing system implemented method of claim 1, wherein the request to release the to-be-released savepoint is received in response to completion of at least one of an insert, an update, and a deletion operation at the coordinator node which changed a database of the database management system.

10. A database management system for releasing a to-be-released savepoint at a remote node in the database management system, the to-be-released savepoint being one of a plurality of savepoints represented by a plurality of control blocks arranged in a linked list stored at the remote node, the database management system comprising:
a coordinator node; and
the remote node, the remote node comprising:
a request receiver that receives a request from the coordinator node to release the to-be-released savepoint;
a control block selector that selects a control block from the plurality of control blocks in the linked list stored at the remote node, wherein the selected control block is a control block representing the to-be-released savepoint; and
a control block merger that merges the selected control block in the linked list stored at the remote node with all other control blocks in the plurality of control blocks representing savepoints that are more recently created than the savepoint represented by the selected control block,
wherein the to-be-released savepoint is released, and
wherein the control block selector determines whether a control block representing the to-be-released savepoint exists, and
if the control block selector determines that the control block representing the to-be-released savepoint does not exist in the linked list stored at the remote node, the control block selector selects a second control block that represents a second savepoint created most recently after the control block representing the to-be-released savepoint,
wherein the second control block is set to be the control block representing the to-be-released savepoint.

11. The database management system of claim 10, wherein the linked list comprises:
a control block representing a most recently created savepoint,
wherein each control block in the linked list comprises a link to another control block representing a less recently created savepoint, and
wherein a control block representing a least recently created savepoint does not have a link to another control block.

12. The database management system of claim 10, wherein the control block merger removes the other control blocks from the linked list and re-arranging the linked list accordingly.

13. The database management system of claim 10, wherein the control block merger sets the selected control block to indicate that the selected control block represents a list of the savepoints from the most recently created savepoint to the savepoint previously represented by the selected control block before the control block merger merges the selected control block.

14. The database management system of claim 11, further comprising a consecutive block merger that merges the selected control block with a next control block, linked by the selected control block, when the selected control block represents a savepoint that is consecutive with the savepoint represented by the next control block.

15. The database management system of claim 14 wherein:
the next control block is removed from the linked list and the linked list is re-arranged accordingly; and
the selected control block is set to indicate that the selected control block represents a list of savepoints from the most recently created savepoint to the savepoint previously represented by the next control block before the next control block was removed.

16. An article of manufacture for releasing a to-be-released savepoint at a remote node in a database management system, the to-be-released savepoint being one of a plurality of savepoints represented by a plurality of control blocks arranged in a linked list stored at the remote node, the article of manufacture comprising:
a program usable medium embodying one or more instructions executable by the data processing system, the one or more instructions comprising:
data processing system executable instructions for receiving a request to release the to-be-released savepoint at the remote node from a coordinator node in the database management system;
data processing system executable instructions for selecting a control block from the plurality of control blocks in the linked list stored at the remote node, wherein the selected control block is a control block representing the to-be-released savepoint; and
data processing system executable instructions for merging the selected control block in the linked list stored at the remote node with all other control blocks in the plurality of control blocks representing savepoints that are more recently created than the savepoint represented by the selected control block; and
data processing system executable instructions for releasing the to-be-released savepoint,
wherein one or more instructions executable by the data processing system further comprise:
determining whether a control block representing the to-be-released savepoint exists in the linked list stored at the remote node;
if it is determined that the control block representing the to-be-released savepoint does not exist in the linked list stored at the remote node, selecting a second control block that represents a second savepoint created most recently after the control block representing the to-be-released savepoint; and
setting the second control block as the control block representing the to-be-released savepoint.

17. The article of manufacture of claim 16, wherein the linked list comprises:
a control block representing a most recently created savepoint,
wherein each control block in the linked list comprises a link to another control block representing a less recently created savepoint, and wherein a control block representing a least recently created savepoint does not have a link to another control block.

18. The article of manufacture of claim 16, wherein the computer executable program code devices for merging further comprises instructions for removing the other control blocks from the linked list and re-arranging the linked list accordingly.

19. The article of manufacture of claim 16, the data processing system executable instructions for merging further comprises instructions for setting the selected control block to indicate that the selected control block represents a list of the savepoints from the most recently created savepoint to the savepoint previously represented by the selected control block before the merging.

20. The article of manufacture of claim 18, further comprising data processing system executable instructions for merging the selected control block with a next control block, linked by the selected control block, when the selected control block represents a savepoint that is consecutive with the savepoint represented by the next control block.

21. The article of manufacture of claim 20 wherein:
the next control block is removed from the linked list and the linked list is re-arranged accordingly; and
the selected control block is set to indicate that the selected control block represents a list of savepoints from the most recently created savepoint to the savepoint previously represented by the next control block before the next control block was removed.

* * * * *